United States Patent
Kadotani et al.

(10) Patent No.: US 6,937,312 B2
(45) Date of Patent: Aug. 30, 2005

(54) LIQUID CRYSTAL DISPLAY DEVICE OF AN IN-PLANE SWITCHING MODE INCLUDING A BLACK MATRIX LAYER

(75) Inventors: Tsutomu Kadotani, Tokyo (JP); Shoichi Kuroha, Tokyo (JP)

(73) Assignee: NEC LCD Technologies, Ltd., Kawasaki (JP)

( * ) Notice: Subject to any disclaimer, the term of this patent is extended or adjusted under 35 U.S.C. 154(b) by 0 days.

(21) Appl. No.: 10/396,562

(22) Filed: Mar. 26, 2003

(65) Prior Publication Data

US 2003/0184693 A1 Oct. 2, 2003

(30) Foreign Application Priority Data

Mar. 28, 2002 (JP) ......................................... 2002-091993

(51) Int. Cl.[7] ...................... G03F 1/1333; G02F 1/1343
(52) U.S. Cl. ..................... 349/141; 349/110; 349/139; 345/100
(58) Field of Search ................................ 349/141, 139, 349/110; 345/100

(56) References Cited

U.S. PATENT DOCUMENTS

| | | | | |
|---|---|---|---|---|
| 6,421,039 B1 | * | 7/2002 | Moon et al. | 345/100 |
| 6,486,933 B1 | * | 11/2002 | Cha et al. | 349/139 |
| 6,618,109 B2 | * | 9/2003 | Hidehira et al. | 349/141 |
| 2001/0046020 A1 | * | 11/2001 | Cho | 349/141 |

FOREIGN PATENT DOCUMENTS

| | | |
|---|---|---|
| JP | 09-080415 | 3/1997 |
| JP | 2001-033821 | 2/2001 |
| KR | 1999-026637 | 4/1999 |

* cited by examiner

Primary Examiner—Huyen Ngo
(74) Attorney, Agent, or Firm—McGinn & Gibb, PLLC

(57) ABSTRACT

A black matrix layer 14 is formed on a counter substrate 13 along the direction where a scanning line 2 extends, so that it continuously covers the upper parts of a common electrode line 3a, the scanning line 2, a space between the common electrode line 3a and the scanning line 2, a TFT 5, a space between the scanning line 2 and a common electrode line 3b, and the common electrode line 3b, and in the portion opposed to the signal line, the black matrix layer is eliminated.

36 Claims, 10 Drawing Sheets

LIQUID CRYSTAL DISPLAY DEVICE OF AN IN-PLANE SWITCHING MODE INCLUDING A BLACK MATRIX LAYER

BACKGROUND OF THE INVENTION

1. Field Of the Invention

The present invention relates to a liquid crystal display device and, more in particular, to a liquid crystal display device of an In-Plane Switching mode.

2. Description of the Prior Art

In recent years, it is well known that the liquid crystal displays used in portable equipment including portable phones and the like have been designed highly efficient and highly functional. Such liquid crystal display devices are thin and lightweight, and are widely used as flat panel displays having low power consumption. Above all, the liquid display devices of a lateral electric field type (In-Plane Switching mode) are formed on an active matrix substrate, and generate a lateral electric field between a pixel electrode and a counter electrode that are mutually opposed.

The liquid crystal display devices of the In-Plane Switching mode perform a display in such a manner as to rotate the liquid crystal held between the active matrix substrate and the counter substrate almost in a horizontal direction to the substrate flat surface so as to perform displays. Accordingly, from the operation mode, wide display properties in the angle of visibility are obtained, thereby expanding utilization fields.

The conventional liquid crystal display device of a lateral electric field type was disclosed in Japanese Patent Laid-Open No. 2001-033821, for example.

The active matrix substrate and the counter substrate are formed with necessary constituent elements, respectively and, after that, are formed with orientation films, respectively. On this orientation film, a rubbing processing is performed to determine an initial orientation direction of the liquid crystal display. Further, a black matrix layer is provided on the counter substrate so that an unnecessary leaked light from a display picture element region is shielded and no orientation defect portion of the liquid crystal display such as discrimination and the like is visualized.

When a uniformity of the rubbing processing is low and the rubbing processing is not sufficiently performed, there occurs a light leak, and contrast properties are reduced. Further, there occurs the light leak due to a pattern of the black matrix layer of the counter substrate.

SUMMARY OF THE INVENTION

The main object of the present invention is to improve contrast properties, thereby providing a liquid crystal liquid display device of an In-Plane Switching mode, which can improve display properties.

That is, the liquid crystal display device of the present invention comprises an active matrix substrate, having a plurality of scanning lines and a plurality of signal lines mutually crossing. And the liquid crystal display device of the present invention comprises a switching element arranged in the vicinity of a portion crossing with the scanning line and the signal line, a pixel electrode connected to the switching element formed in the region surrounded by the scanning line and the signal line.

The liquid crystal display device of the present invention comprises a common electrode opposing to the pixel electrode which generates a lateral electric field between pixel electrodes and common electrodes.

The liquid crystal display device of the present invention comprises the counter substrate which holds a liquid crystal display layer between it and the active matrix substrate, wherein the counter substrate has a black matrix layer formed in the portion where a plurality of scanning lines are overlapped two-dimensionally, and in the portion opposed to the signal line, the black matrix layer is eliminated.

DETAILED DESCRIPTION OF THE PREFERRED EMBODIMENTS

Next, embodiments of a liquid crystal display device of the present invention will be described in detail with reference to the drawings.

[First Embodiment]

Figure 1:
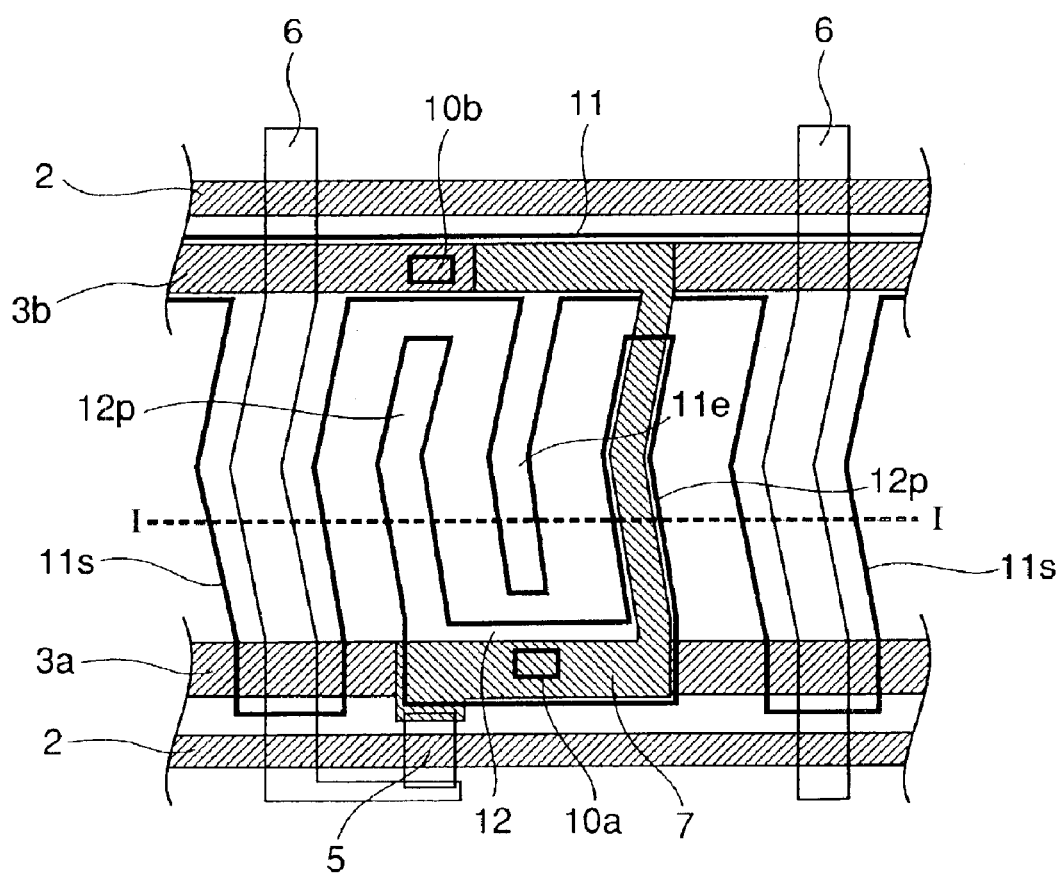
FIG. 1 is a top view of a TFT substrate for explaining a liquid crystal display device of a first embodiment of the present invention.
Figure 2:
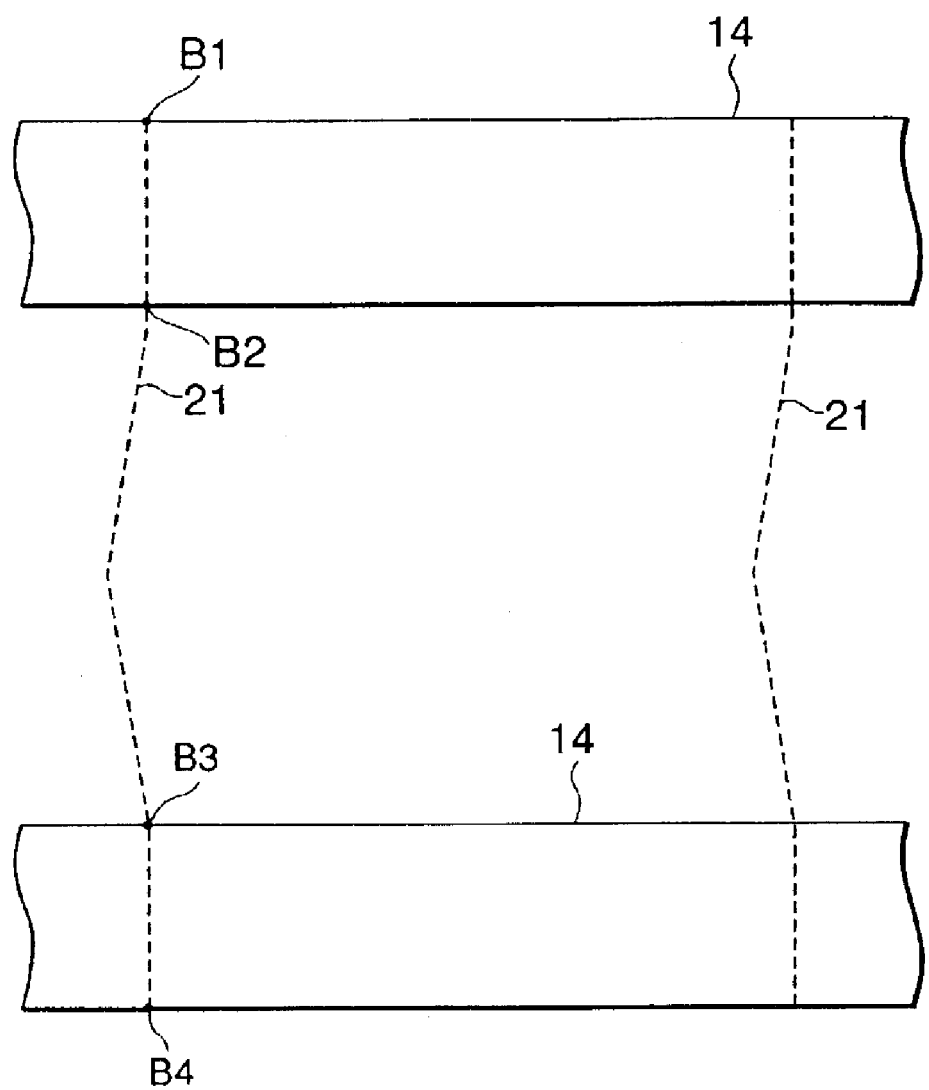
FIG. 2 is a top view of a counter substrate for explaining the liquid crystal display device of the first embodiment of the present invention.
Figure 3:
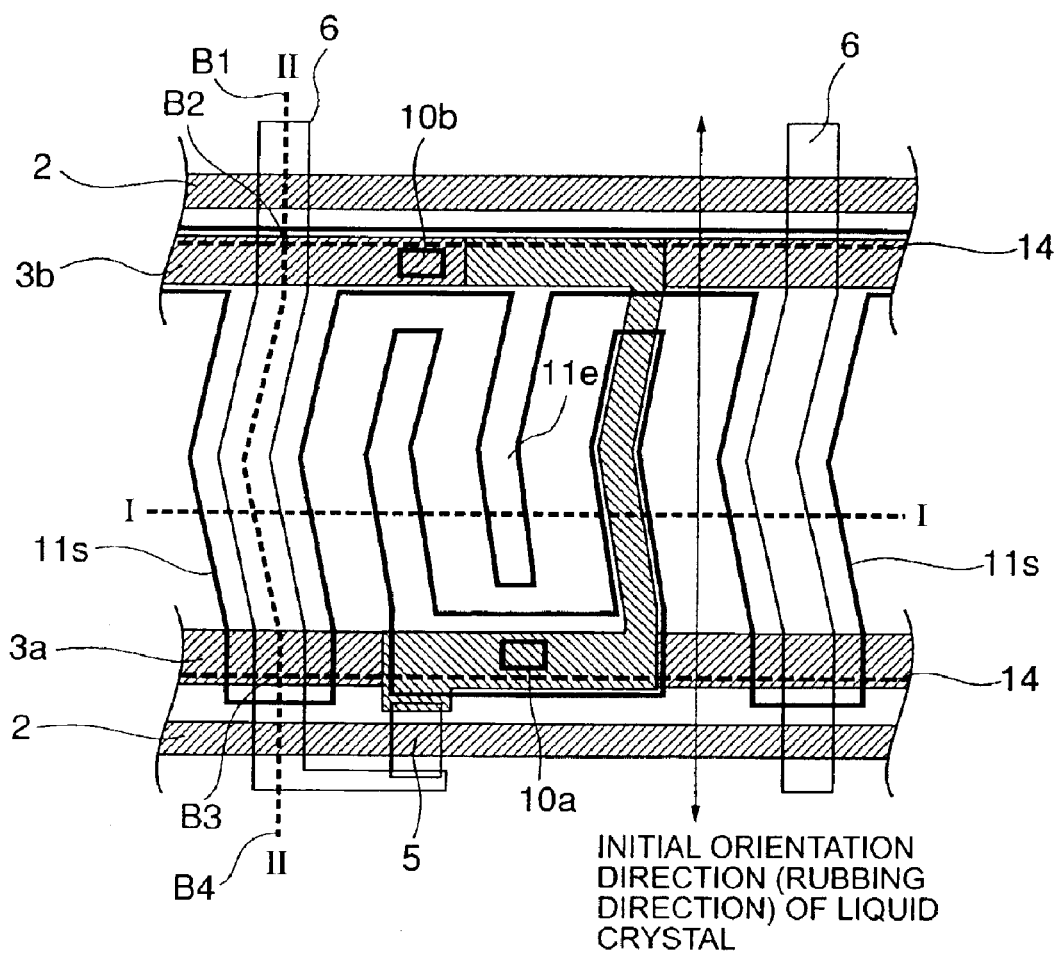
FIG. 3 is a top view of the liquid crystal display device of the first embodiment of the present invention.
Figure 4:
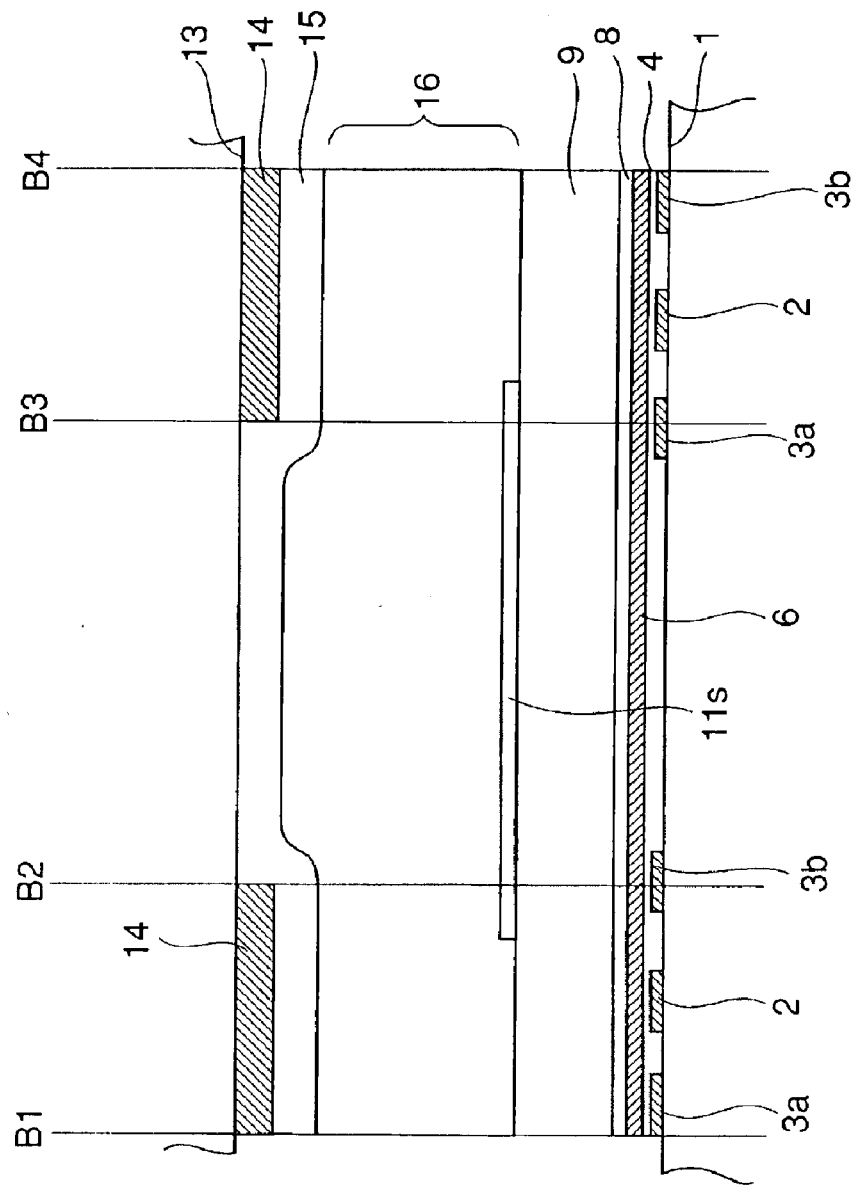
FIG. 4 is a sectional view cut along the line II—II in FIG. 3.

FIG. 1 is a top view showing an display region for one picture element portion of a TFT substrate for explaining a liquid crystal display device of a first embodiment of the present invention, FIG. 2 is a top view of a counter substrate for explaining the liquid crystal display device of the first embodiment of the present invention, and FIG. 3 is a top view showing almost one pixel of the liquid crystal display device of the first embodiment of the present invention which is constituted by having the TFT substrate shown in FIG. 1 and the counter substrate shown in FIG. 2 opposed to each other. FIG. 4 is a sectional view cut along the line II—II in FIG. 3.

The first embodiment is for the case where the present invention is adapted to a monochrome liquid crystal display device that holds a TFT substrate between a counter substrate 13 and a liquid crystal layer 16, and has a special characteristic in a black matrix layer 14 formed in a counter substrate 13.

As shown in FIGS. 1 and 4, the TFT substrate 1 includes a scanning line 2, common electrode lines 3a and 3b which are provided by being spaced at both sides of the scanning line and given a standard potential, a gate insulating film 4 to cover these elements and a semiconductor layer provided on the gate insulating film, respectively.

The end portion of the semiconductor layer includes a source electrode and a drain electrode which are mutually spaced apart and electrically connected, and a thin film transistor (TFT) 5 which takes a portion overlapping the scanning line 2 as a gate electrode. Further, it includes a signal line 6, which is connected to a drain line of the TFT 5 and is arranged so as to cross the scanning line 2 on a gate insulating film 4, and a pixel wiring 7, which is arranged by being connected to the source electrode of the TFT 5 and passing through a display picture element region from the upper portion of a common electrode line 3a formed on the gate insulating film 4 and extending to the upper portion of a common electrode line 3b.

The liquid crystal display device includes a protection layer 8 which covers the TFT 5, the signal line 6 and the pixel wiring 7, and an interlayer insulating film 9 which is thickly formed on this protection layer 8 and is more flattened in its surface than the protection layer 8 and consists of organic resin.

On the interlayer insulating film 9 is formed a pixel line 12 which passes above a common electrode line 3a, and a pixel electrode 12p which branches from the pixel line 12 and extends to the display picture element region in the shape of a comb. This pixel line 12 penetrates the protection film 8 and the interlayer insulating film 9, and is electrically connected to the pixel wiring 7 though a contact hole 10a arranged on the pixel wiring 7.

Further, on the interlayer insulating layer 9 is formed a common electrode line 11 which covers on a common electrode line 3b, a shield common electrode line 11s which branches from the common electrode line 11 and extends upward to a common electrode line 3a along the signal line 6, and a common electrode 11e which branches from the common electrode line 11 and extends to the display picture element region and opposes to a picture element electrode 12p. This common electrode line 11 penetrates the gate insulating layer 4, the protection layer 8 and the interlayer insulating film 9, and is electrically connected to the common electrode line 3b through a contact hole 10b arranged on the common electrode line 3b.

Here, the scanning line 2, the common electrode lines 3a and 3b, the signal line 6, the pixel wiring 7 and the like are formed by opaque conductive materials, and the pixel electrode 12p, the pixel wiring 12, the common electrode 11e, the common electrode line 11, the shield common electrode 11s and the like which are on the interlayer insulating film, are formed by transparent conductive materials such as ITO and the like.

The structure of this TFT substrate realizes the improvement of the aperture ratio of the display picture element region and the improvement of display properties by eliminating the opaque common electrode line in the vicinity of the signal line 6 and by shielding the leaked electrical field from the signal line 6 by means of the transparent shield common electrode 11s arranged on the signal line 6.

Further, as shown in the drawings, the pixel electrode 12p, the common electrode 11e, the signal line 6, the shield common electrode 11s have a curved once shape, respectively. This is referred to as a multi-domain type, and the pixel electrode 12p and the common electrode 11e and the shield common electrode 11s are curved an odd number of times so as to have a line symmetry shape and, by a lateral electric field between the pixel electrode 12p and the common electrode 11e and the shield common electrode 11s, a liquid crystal molecule in one crystal element is rotated in a reverse direction, so that a color shift phenomenon due to a change in a visual angle for the liquid crystal display device is eliminated.

On the other hand, as shown in FIGS. 2 to 4, the counter substrate 13 includes a linear black matrix layer 14, and, further, includes an over coat layer (OC layer) 15, which covers the black matrix layer 14 and the counter substrate 13.

The present embodiment has a crucial characteristic in the black matrix layer 14. A broken line shown in FIG. 2 shows a picture element section. FIG. 4 is a sectional view cut along the line II—II in FIG. 3, and B1 to B4 shown in FIG. 4 corresponds to spots of B1 to B4 shown in FIG. 3, respectively.

As shown in this FIG. 4, there is the black matrix layer 14 formed between B1·B2 and B3·B4, which are represented in the sectional view cut along the line II—II in FIG. 3. However, there is no black matrix layer 14 formed between B2·B3.

FIG. 3 shows an end portion of the black matrix 14 in bold dotted line and, in summing up the above descriptions, the black matrix layer 14 is formed on the counter substrate 13 along the direction where the scanning line 2 extends, so that it continuously covers the upper parts of the common electrode line 3a, the scanning line 2, a space between the common electrode line 3a and the scanning line 2, the TFT 5, a space between the scanning line 2 and the common electrode line 3b and the common electrode line 3b. The present embodiment is characterized in that the black matrix layer is eliminated at a portion opposed to the signal line 6 of the counter substrate 13.

This black matrix layer 14 is made of resin, and is formed of a material in which a black pigment is distributed in an organic resin material. The black matrix layer 14 made of resin is formed thickly to secure a practical OD value. However, a relatively large step rises on the counter substrate 13 if formed thickly.

Next, the knowledge of the present inventor will be described. In the liquid crystal display device of an active matrix type, it is a common practice to provide a black matrix layer on the spot of the counter substrate which is opposed to the scanning line and the signal line, and in the liquid crystal display device in which rectangular picture elements are arrayed in an array shape, the black matrix layer having a rectangular shaped aperture is formed.

If this method is adapted to the liquid crystal display device in which the signal line 6 is curved as described above, the counter substrate of the spot which is opposed to the curved signal line will be provided with a curved black matrix layer. That is, it becomes a black matrix layer having a deformed hexagonal aperture. When, on such a black matrix layer, the OC layer is provided and an orientation film is further provided and, then, it is subjected to the rubbing processing in the initial orientation direction of the liquid crystal as shown in FIG. 3, a rubbing defect due to the step by the black matrix layer is assumed to occur in the vicinity of a curved black matrix layer of the spot which is opposed to a curved signal line comparing to other spots. When such a rubbing defect occurs, a light leak phenomenon occurs in the vicinity of the curved black matrix layer, that is, in the peripheral portion of the display picture element region and, therefore, the contrast properties of the display picture element are reduced.

In contrast to this, similarly as the present embodiment, the black matrix layer 14 is formed on the counter substrate 13 along the direction where the scanning line 2 extends, so that it continuously covers the upper parts of the common electrode line 3a, the scanning line 2, a space between the common electrode line 3a and the scanning line 2, the TFT 5, a space between the scanning line 2 and the common electrode line 3b, and the common electrode line 3b, and at the same time the portion which is opposed to the signal line 6 of the counter substrate 13 is not provided with the black matrix layer 14, so that the light leak phenomenon in the vicinity of the curved signal line 6, that is, in the peripheral portion of the display picture element region is eliminated, thereby improving the contrast properties of the display picture element.

A constitution where the portion which is opposing to the counter substrate 13 and the signal line 6 is not provided with the black matrix layer is brought about by the constitution of the above-described TFT substrate side and, even when the black matrix layer is not provided here, the unnecessary light from a black light is shielded by the signal line 6, so that the deterioration of the display properties is not invited.

Accordingly, according to the present embodiment, in addition to the effect brought about by the constitution of the TFT substrate side as a whole, a monochrome liquid crystal display device of an In-Plane Switching mode compatible with a high angle of visibility, a low color shift in wide range of viewing angle, a high aperture ratio can be realized.

By way of precaution, a rubbing uniformity of the orientation film in the vicinity of the black matrix layer 14 that is provided along a direction to which the scanning line 2 extends will be described. When the counter substrate 13 such as that of the present embodiment is provided with the orientation film and the rubbing processing is performed in the direction shown in FIG. 3, there arise, in the orientation films in the vicinity of both the black matrix layers 14, regions where particles scraped from the orientation film are accumulated on the one hand and where the rubbing is not sufficiently performed as being shadowed by the black matrix layer 14 on the other hand.

However, since the black matrix layer 14 is provided by visually blocking the space between the scanning lines 2 and the common lines 3a and 3b while maintaining a sufficient width, almost no influence is caused to the display properties, thereby making it possible to sufficiently exert the primary function of the matrix layer 14.

That is, even when the region in which the rubbing is not sufficiently performed comes into existence, since it overlaps the common electrode lines 3a or 3b, the back light is shielded by the opaque common electrode lines 3a or 3b so that this region is non-visualized, and no adverse effect on the display properties can be exerted.

Figure 5:
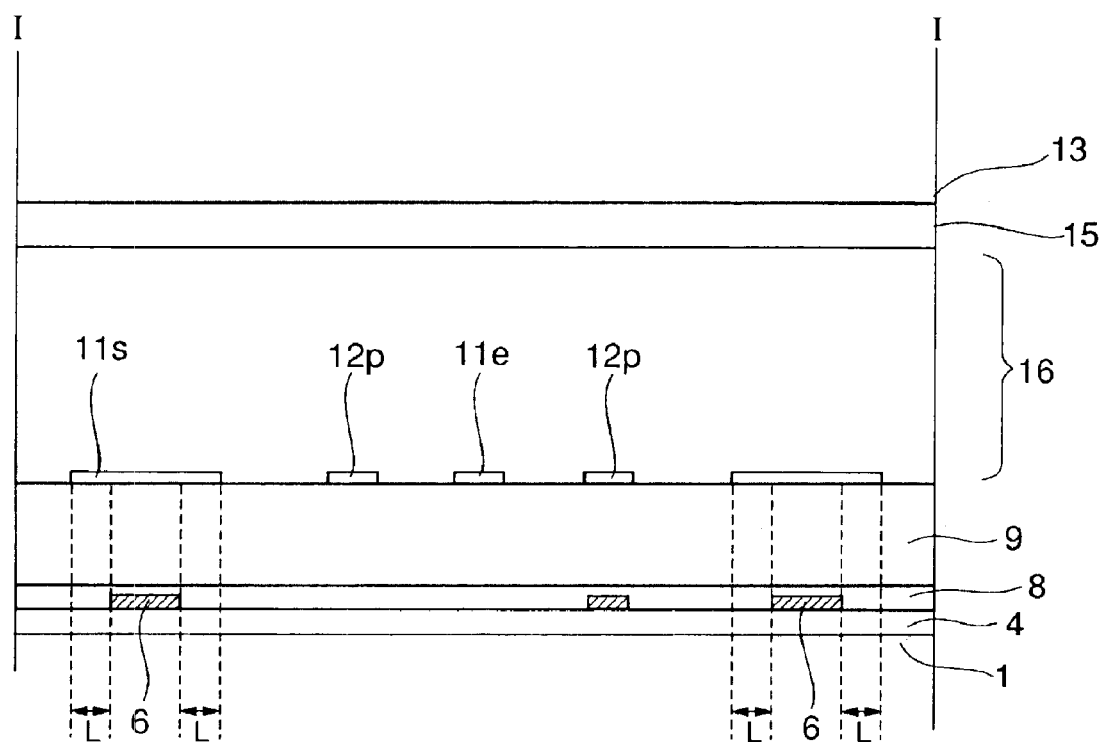
FIG. 5 is a sectional view cut along the line I—I in FIGS. 1 and 3 for explaining a relation between a signal line and a shield common electrode of the first embodiment.

FIG. 5 is a sectional view cut along the line I—I in FIGS. 1 and 3 for explaining a relation between the signal line and the shield common electrode of the first embodiment.

The shield common electrode 11s is formed in such manner that it is broader than the signal line 6 and is projected to both sides of the signal line 6 by a factor of a width L. Although the width L, when taking into consideration a repression of a cross talk, is related to the film thickness of the interlayer insulating film, in the case where the film thickness of the interlayer insulating film is 1.5 $\mu$m to 3 $\mu$m, the width L requires at least equal to or more than 4 $\mu$m, and particularly in the case where it is equal to or more than 6 $\mu$m, a repression effect is sufficient. Here, in view of reducing the light leak by shielding the lower part of the transparent shield common electrode 11s, L is preferably made smaller.

Further, in view of the aperture ratio calculated in the light transmission region between the picture element electrode and the common electrode as well as the shield common electrode, it is preferable that the width of the shield common electrode 11s is made smaller so as to make L smaller in order to make the aperture area broader. In view of the cross talk, the light shielding and the aperture ratio, L is preferably kept in the range of 4 $\mu m \leq L \leq 10$ $\mu$m. Particularly, in order to reduce the cross talk, L is more preferably kept in the range of 6 $\mu m \leq L \leq 10$ $\mu$m.

The above-described monochrome liquid crystal display device also combines a characteristic capable of realizing the display of high contrast since there is no light scattering of the back light due to color layers and, therefore, a black luminance is low for a panel transmittance comparing to a color liquid crystal display device comprising color filters of RGB, gaining the number of gray scales, reducing the consumption power of the back light in the case of the same white (max) luminance and the like, and it is expected to be utilized as the liquid crystal display device having a high contrast, a high gray scale, and a low power consumption.

[Second Embodiment]

Next, a liquid crystal display device of a second embodiment of the present invention will be described with reference to the drawings.

Figure 6:
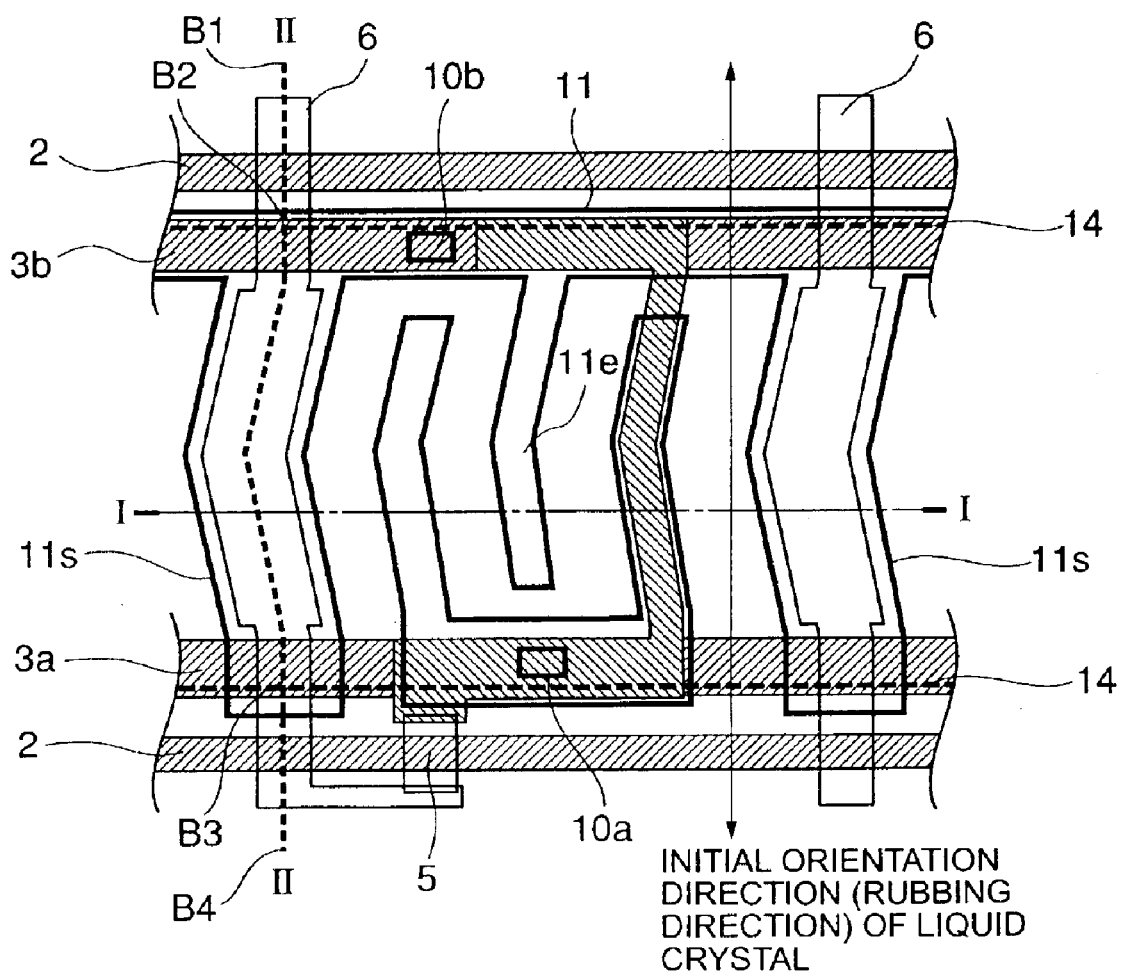
FIG. 6 is a top view of the TFT substrate for explaining the liquid crystal display device of a second embodiment of the present invention.

FIG. 6 is a top view showing a display region of almost one picture element portion of a liquid crystal display device of the second embodiment of the present invention. The present embodiment, similarly as the first embodiment, is the case where the present invention is adopted to a monochrome crystal display device which holds a liquid crystal layer 16 between a TFT substrate 1 and a counter substrate 13. Note that the detailed description of the constitutions which are the same as those of the first embodiment will be omitted by attaching the same reference numerals.

In the present embodiment, a signal line 6 is provided with a wide width portion 6W. This wide width portion 6W is a portion in which the signal line is curved. The constitution other than this is the same as that of the first embodiment. By providing the wide width portion 6W so as to reduce a region in which shield common electrode 11s and the wide width portion 6w do not overlap, a light leak is reduced from a back light, which deteriorates the display properties by filtering the transparent shield common electrode 11s, and which is arranged in the rear side of the liquid crystal display device. The shield common electrode 11s above the wide width portion 6w has a width formed broader than that of the wide width portion 6w, and is designed such that the liquid crystal layer 16 is not affected by the electric field from the signal line 6 and the wide width portion 6w.

According to the present embodiment, similarly as the above-described embodiment, a light leak phenomenon caused by a rubbing defect in the vicinity of the curved signal line 6, that is, in the peripheral portion of a display picture element region is eliminated, and contrast properties of the display element can be improved and, further, the light leak of the back light is reduced by the wide width portion 6w so that the contrast properties can be further improved. Accordingly, according to the present embodiment, in addition to the effect brought about by the constitution of the TFT substrate side as a whole, a monochrome liquid crystal display device of an In-Plane Switching mode compatible with a high angle of visibility, a low color shift in wide range of viewing angle, a high aperture ratio can be realized.

[Third Embodiment]

Next, a liquid crystal display device of a third embodiment of the present invention will be described with reference to the drawings.

Figure 7:
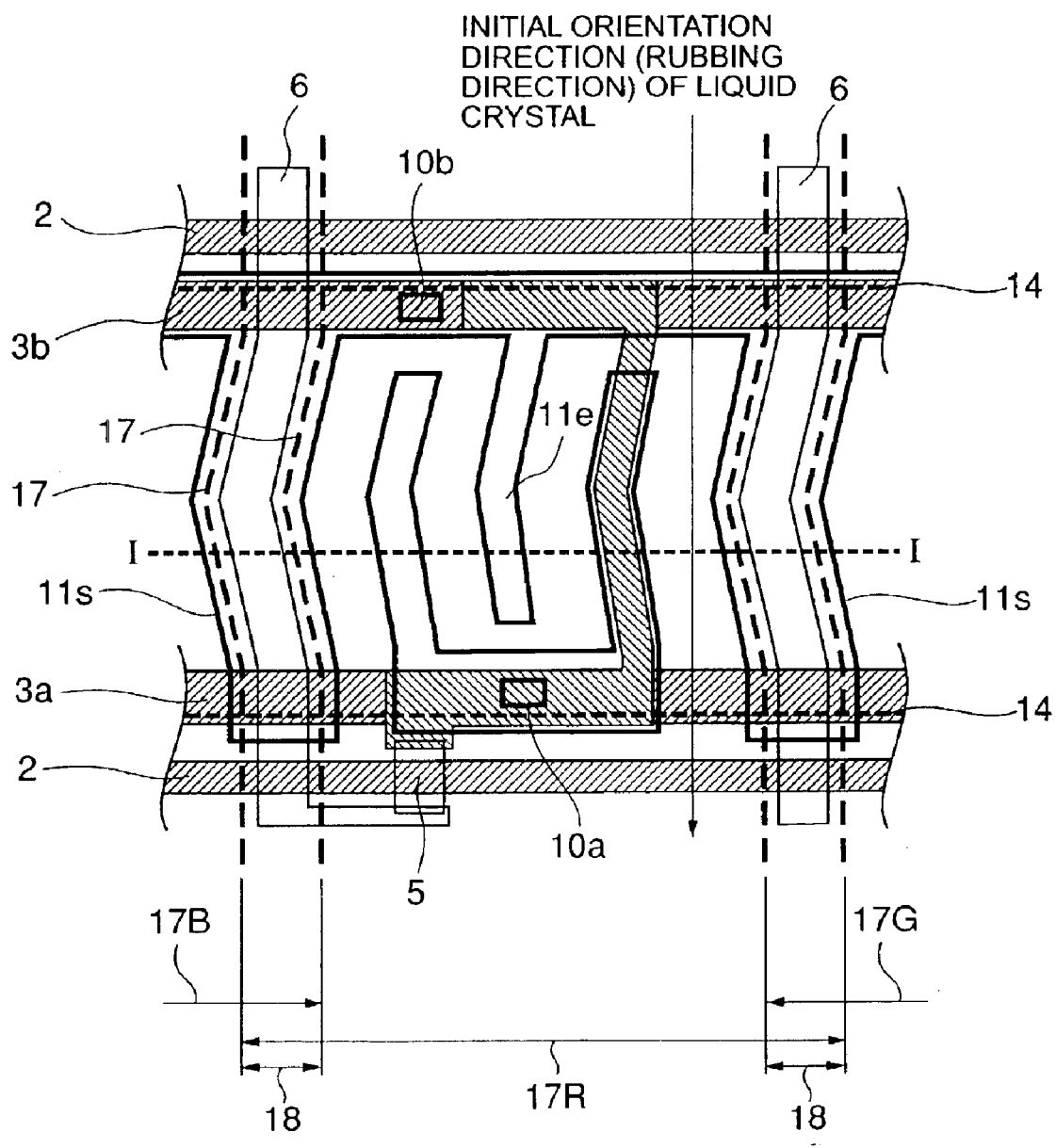
FIG. 7 is a top view of the TFT substrate for explaining of the liquid crystal display device of a third embodiment of the present invention.
Figure 8:
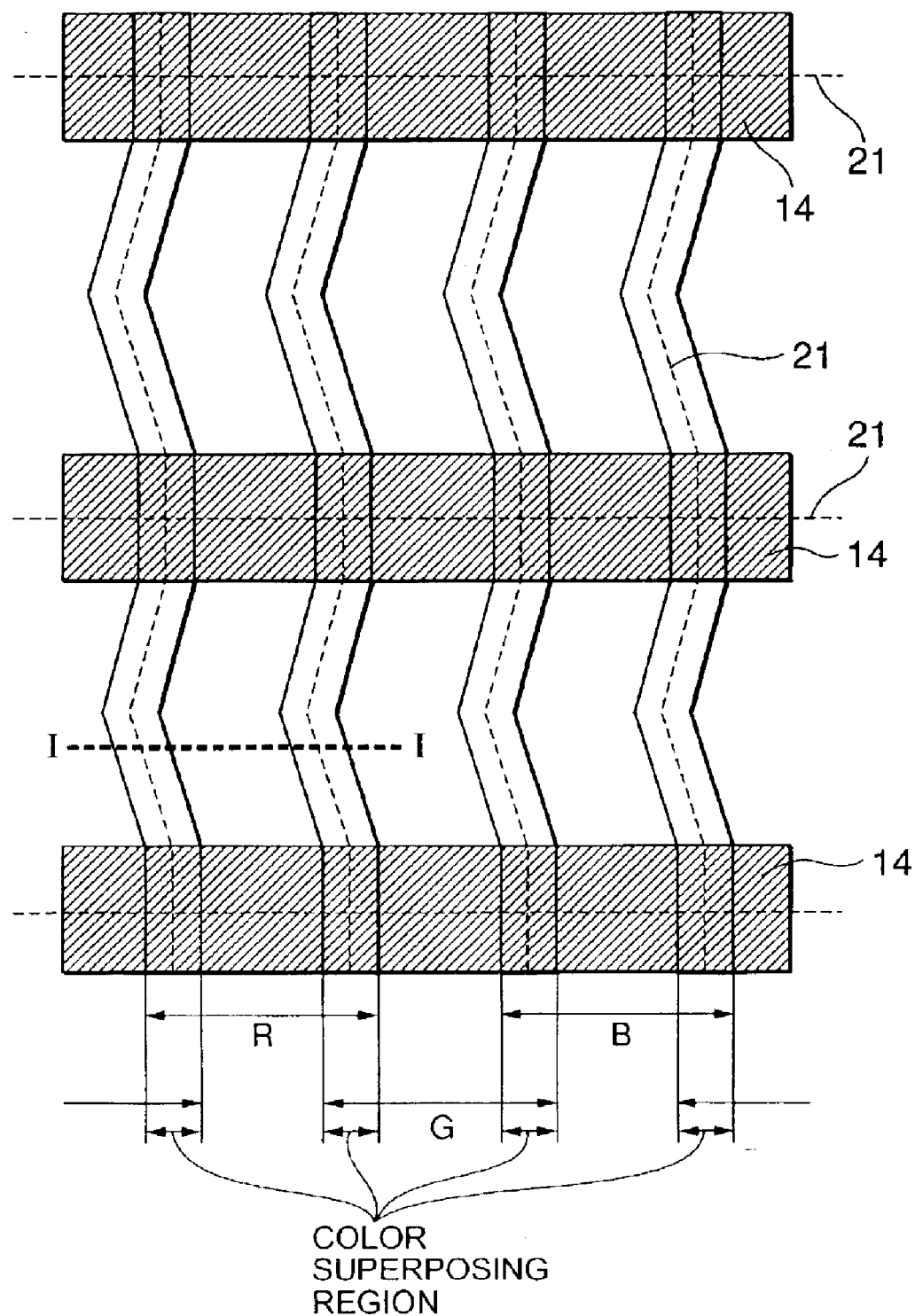
FIG. 8 is a top view of the counter substrate for explaining the liquid crystal display device of the third embodiment of the present invention.
Figure 9:
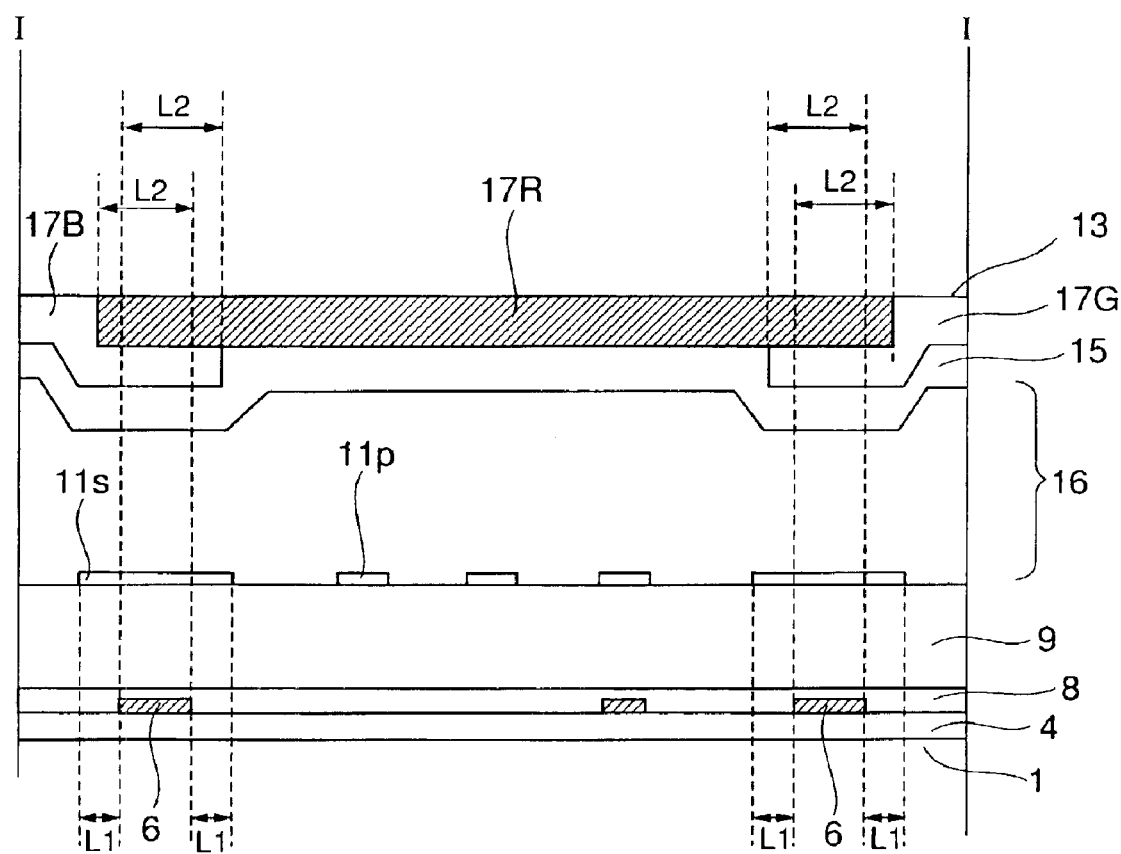
FIG. 9 is a sectional view cut along the line I—I in FIG. 7 for explaining a relation among the signal line, the shield common electrode and a color overlapping region of the third embodiment.

FIG. 7 is a top view of a TFT substrate for explaining the liquid crystal display device of the present embodiment, FIG. 8 is a top view of a counter substrate for explaining the liquid crystal display device of the present embodiment, FIG. 9 is a sectional view cut along the line I—I in FIG. 7 for explaining a relation among a signal line, a shield common electrode and a color superposing region of the present embodiment. Note that the description of the same constitutions as those of the first and second embodiments will be omitted by attaching the same reference numerals.

The present embodiment is the case where the present invention is adopted to a color liquid crystal display device comprising color layers of RGB on a counter substrate. The constitution of a TFT substrate side is the same as the TFT substrate 1 of the first embodiment and, therefore, the description of the TFT substrate 1 will be omitted, and the constitution of the counter substrate will be described.

In the present embodiment also, similarly as the first and second embodiments, a black matrix layer 14 is formed on the counter substrate 13 along the direction where a scanning line 2 extends, so that it continuously covers the upper parts of a common electrode line 3a, a scanning lines 2, a space between the common electrode line 3a and the scanning line 2, a TFT 5, a space between the scanning line 2 and the common electrode line 3b, and the common electrode line 3b. Further, the present embodiment is provided with color layers 17 (red color layer 17R, green color layer 17G, blue color layer 17B) to realize a color display, and both ends of the color layer 17R form a color-superposing region 18 by having the end of the color layer 17B of an adjoining picture element and the end of the color layer 17G of an adjoining picture element overlapped. Each of the color layers 17 has a curved striped shape where the signal line 6 is curved, and the color-superposing region 18 has a broader width than that of the signal line 6, and is arranged so as to overlap the signal line 6. Since the color superposing region 18 has a lower light transmission coefficient compared to other portions of the color layers 17, it can realize the same function as the black matrix. Further, comparing to the one having the black matrix layer on the portion opposing to the signal line 6, the step of an orientation film substrate is reduced.

Accordingly, according to the present embodiment, similarly as the above-described first and second embodiments, a light leak phenomenon caused by a rubbing defect in the vicinity of the signal line 6, that is, in the peripheral region of a display picture element region is eliminated, so that the contrast properties of a display picture element can be improved. Accordingly, according to the present embodiment, in addition to the effect brought about by the structure of a TFT substrate side as a whole, a color liquid crystal display device of an In-Plane Switching mode compatible with a high angle of visibility, a low color shift in wide range of viewing angle, a high aperture ratio can be realized.

Here, the width of the shield common electrode 11s will be described with reference to FIG. 9.

The shield common electrode 11s blocks off a leaked electric field from the signal line 6 and, in order to allow this function to be exerted, it is formed with a width which projects to both sides of the signal line 6 by a factor of L1. This L1, when taking into consideration a repression of a cross talk, requires at least equal to or more than 4 µm, and particularly in the case where it is equal to or more than 6 µm, a repression effect is sufficient. Here, in view of shielding the light of the lower part of the transparent shield common electrode 11s, similarly as the above-described second embodiment, it is preferable that the signal line 6 is made wider and provided with a wider width portion 6w and L1 is made smaller. Further, in view of an aperture ratio, it is preferable that the width of the shield common electrode 11s is made smaller and L1 is made smaller. Taking all written above (cross talk, shielding of light, and aperture ratio) into consideration, L is preferably kept in the range of 4 µm≦L≦10 µm. Particularly, in order to reduce the cross talk, L is more preferably kept in the range of 6 µm≦L≦10 µm.

Further, the width of the portion of a color-superposing color region 18 will be described. A distance L2 between the end portion of color layers 17 superposed in the color superposing region 18 and the end portion of the signal line 6 which is far from the other end portion is, when taking into consideration a prevention of a color mixing by a oblique transmitted light from a back light, is preferably taken as L2≧8 µm.

While the preferred embodiments have been described as above, it is to be understood that the present invention is not limited to those embodiments, but that various modifications of the invention and its practical application to other types of the liquid crystal display may be possible without departing from the spirit and the scope of the invention.

For example, with regard to the non-uniformity of the rubbing processing for the orientation film caused by the existence of the black matrix layer on the counter substrate, not only in the liquid crystal display device of a multi-domain type in which the picture element electrode and the counter electrode as described in the first embodiment are curved, but also in the liquid crystal display device of a single domain type in which the picture element, the counter electrode and the signal line are not curved but formed straight, it is expected to become even more striking accompanied with the progress of larger screen and high resolution of the liquid crystal display device. Hence, it is considered that the present invention is also adapted to such liquid crystal display devices.

Figure 10:
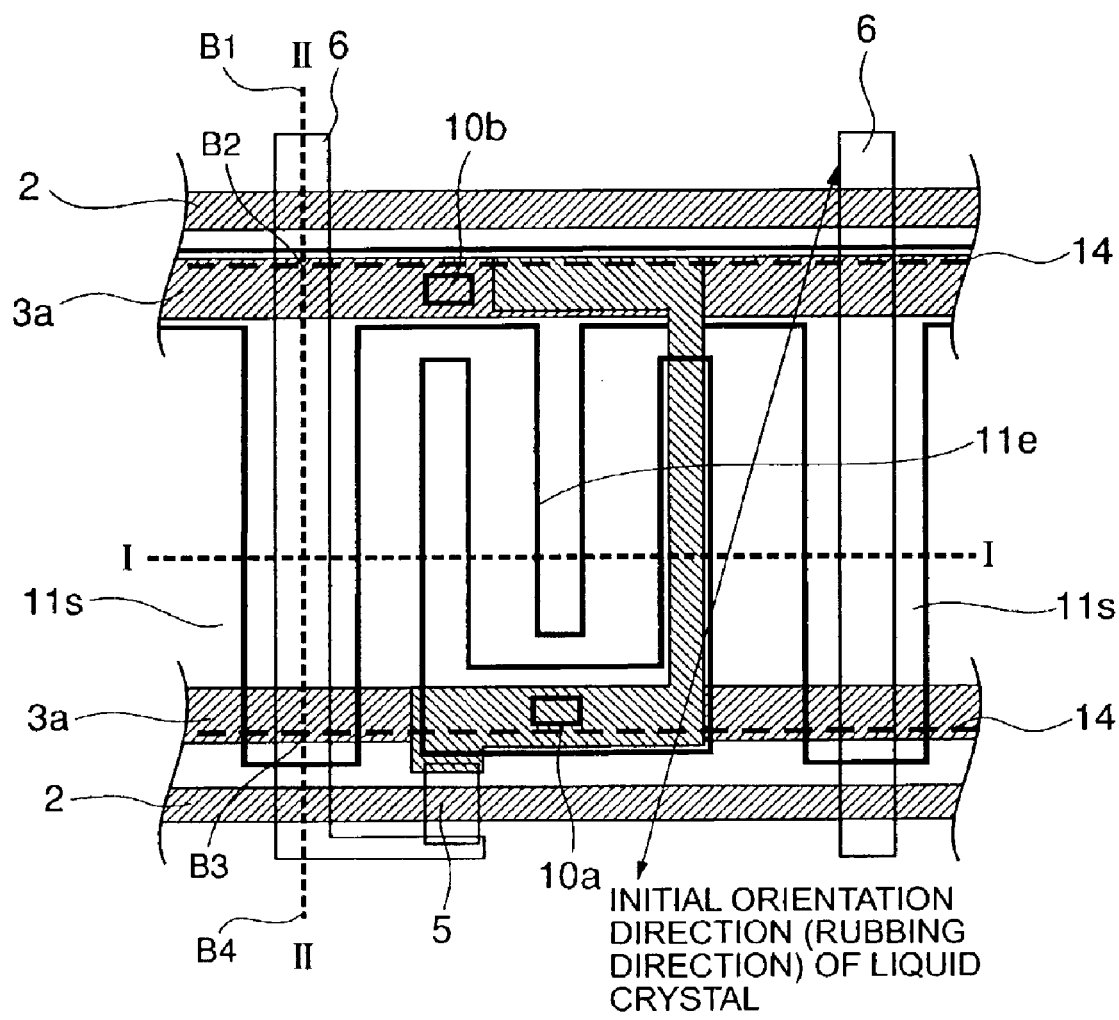
FIG. 10 is a top view showing an example in which the present invention is adapted to the liquid crystal display device of a single domain type.

FIG. 10 shows the case where the present invention is adapted to the liquid crystal display device of such single domain type. Although the rubbing direction (initial orientation direction of a liquid crystal monocular) of the liquid crystal display device of the above-described multi-domain type is in parallel to a longitudinal direction of the signal line, the rubbing direction of the liquid crystal display device of the single-domain type is set, for example, to a direction reclined about 10° to 30° toward the longitudinal direction of the signal line.

Further, as for other modifications, in order to improve the uniformity of the rubbing process for the orientation film, it is considered to make the film thickness of the black matrix thinner. Specifically, by making the thickness 0.9 µm to 1.3 µm, the step due to the black matrix layer is reduced and the uniformity of the rubbing processing will be improved. Although the above-described numeric range of the film thickness assumes the case where the OD value is 3.2 per 1 µm, if the OD value has much larger material, the film thickness of the black matrix layer may be made thinner so that the uniformity can be improved.

Although, in the above-described embodiments, the black matrix layer was described by the layer made of resin, it may be the layer made of metal. In general, for the same film thickness, the OD value is higher for the black matrix layer made of metal. If it is a metallic black matrix layer, it can gain a high OD value with a thin film thickness comparing to a resinous black matrix layer, and this will lead to the elimination of the step due to the black matrix layer and improve the uniformity of the rubbing processing.

As described above, according to the liquid crystal display device according to claim 1 of the present invention, a rubbing uniformity in the vicinity of the signal line of each display picture element is improved, the contrast of each display picture element can be improved as a whole.

What is claimed is:

1. A liquid crystal display device, comprising:
   an active matrix substrate including a switching element, a pixel electrode; a first common electrode line, and a second common electrode line,
      said switching element being arranged in the vicinity of a crossing portion of a scanning line and a signal line,
      said pixel electrode being connected to said switching element;
   a third common electrode line being arranged to generate a lateral electric field between said pixel electrode and said third common electrode line;
   a counter substrate opposed to said active matrix substrate being provided with a black matrix layer; and
   a liquid crystal disposed between said active matrix substrate,
   wherein said black matrix layer is extended along an extending direction of said scanning line without overlapping a region between said first common electrode line and said second common electrode line.

2. The liquid crystal display device according to claim 1, wherein said pixel electrode and said third common electrode comprise a curved part including an odd number of bends within one picture element, and
   wherein said signal line comprises a portion adjoining at least one of said pixel electrode and said third common electrode line and comprising a curved part including an odd number of bends.

3. The liquid crystal display device according to claim 2, wherein said signal line comprises a wide width portion in the portion adjoining to said pixel electrode.

4. The liquid crystal display device according to claim 2, wherein said counter substrate includes a plurality of color layers in which end portions are mutually superposed by adjoining picture elements.

5. The liquid crystal display device according to claim 4, wherein said color superposing region is arranged above the signal line of the active matrix substrate.

6. The liquid crystal display device according to claim 1, wherein said signal line comprises a wide width portion in the portion adjoining to said pixel electrode.

7. The liquid crystal display device according to claim 1, wherein said counter substrate includes a plurality of color layers in which end portions are mutually superposed by adjoining picture elements.

8. The liquid crystal display device according to claim 7, wherein said color superposing region is arranged above the signal line of the active matrix substrate.

9. The liquid crystal display device according to claim 1, wherein said scanning line comprises a first scanning line adjacent to said first common electrode line and a second scanning line adjacent to said second common electrode line.

10. The liquid crystal display device according to claim 9, wherein said black matrix layer extends along an extending direction of said first scanning line such that said black matrix layer covers said first common electrode line, said first scanning line, a space between said first common electrode line and said first scanning line, and said switching element.

11. The liquid crystal display device according to claim 9, wherein said black matrix layer extends along an extending direction of said second scanning line such that said black matrix layer covers said second common electrode line, said second scanning line, and a space between said second common electrode line and said second scanning line.

12. The liquid crystal display device according to claim 9, wherein said black matrix layer extends along an extending direction of said first scanning line such that said black matrix layer continuously covers said first common electrode line, said first scanning line, a space between said first common electrode line and said first scanning line, and said switching element.

13. The liquid crystal display device according to claim 9, wherein said black matrix layer extends along an extending direction of said second scanning line such that said black matrix layer continuously covers said second common electrode line, said second scanning line, and a space between said second common electrode line and said second scanning line.

14. The liquid crystal display device according to claim 1, wherein said black matrix layer comprises a black matrix layer including a resin.

15. The liquid crystal display device according to claim 1, wherein said black matrix layer comprises a black matrix layer including a black pigment which is distributed in an organic resin material.

16. The liquid crystal display device according to claim 1, wherein said first common electrode and said second common electrode extend along said extending direction of said scanning line.

17. The liquid crystal display device according to claim 1, wherein said third common electrode extends substantially along a direction other than said extending direction of said scanning line.

18. The liquid crystal display device according to claim 1, wherein said black matrix layer extends along an extending direction other than an extending direction of said signal line.

19. The liquid crystal display device according to claim 1, wherein said black matrix layer covers a portion of said signal line other than a portion of said signal line which is disposed in said region between said first common electrode line and said second common electrode line.

20. The liquid crystal display device according to claim 1, wherein said black matrix layer does not cover a portion of said signal line which is disposed in said region between said first common electrode line and said second common electrode line.

21. The liquid crystal display device according to claim 1, wherein a portion of said counter substrate, which is opposed to said signal line of said active matrix substrate, is not provided with the black matrix layer such that light leak phenomenon in a peripheral portion of a display picture element region is eliminated.

22. The liquid crystal display device according to claim 21, wherein said peripheral portion of said display picture element region includes a vicinity of a curved signal line.

23. The liquid crystal display device according to claim 1, wherein said third common electrode line comprises a shield common electrode.

24. The liquid crystal display device according to claim 1, wherein a width (L) of said shield common electrode is greater than a width of said signal line.

25. The liquid crystal display device according to claim 24, wherein said width (L) of said shield common electrode is projected to both sides of said signal line by a factor of said width (L).

26. The liquid crystal display device according to claim 24, wherein said width (L) satisfies a condition 4 $\mu$m$\leq$L$\leq$10 $\mu$m, and more preferably, wherein said width (L) satisfies a condition 6 $\mu$m$\leq$L$\leq$10 $\mu$m.

27. The liquid crystal display device according to claim 1, wherein at least one of said first common electrode line and said second common electrode line comprise an opaque conductive material.

28. The liquid crystal display device according to claim 1, wherein said third common electrode line comprises a transparent conductive material.

29. A liquid crystal display device, comprising:
   an active matrix substrate including a switching element, a pixel electrode, and a common electrode line, wherein said common electrode line comprises a first common electrode line, a second common electrode line, and a third common electrode line;
   a counter substrate opposed to said active matrix substrate; and
   a black matrix layer provided on said counter substrate,
   wherein said switching element is arranged in the vicinity of a crossing portion of a scanning line and a signal line, and
   wherein said black matrix layer is extended along an extending direction of said scanning line without overlapping a region between said first common electrode line and said second common electrode line.

30. The liquid crystal display device according to claim 29, further comprising a liquid crystal layer disposed between said active matrix substrate and said counter substrate.

31. The liquid crystal display device according to claim 29, wherein said pixel electrode is connected to said switching element.

32. The liquid crystal display device according to claim 29, wherein said third common electrode line is arranged to generate a lateral electric field between said pixel electrode and said third common electrode line.

33. The liquid crystal display device according to claim 29, wherein said pixel electrode and said third common electrode comprise a curved part including an odd number of bends within one picture element.

34. The liquid crystal display device according to claim 29, wherein said signal line comprises a portion adjoining at least one of said pixel electrode and at least one of said first common electrode, said second common electrode, and said third common electrode.

35. The liquid crystal display device according to claim 34, wherein said portion comprises a curved part including an odd number of bends.

36. A liquid crystal display device, comprising:
   an active matrix substrate;
   a counter substrate opposed to said active matrix substrate;
   a liquid crystal display layer between said active matrix substrate and said counter substrate; and
   a black matrix layer provided on said counter substrate,
   wherein said black matrix layer is formed on a portion of said counter substrate other than a portion of said counter substrate which is opposed to a signal line.

* * * * *